US010071624B2

(12) United States Patent
Koch et al.

(10) Patent No.: US 10,071,624 B2
(45) Date of Patent: Sep. 11, 2018

(54) DRIVE DEVICE FOR A MOTOR VEHICLE

(71) Applicant: AUDI AG, Ingolstadt (DE)

(72) Inventors: Wolfgang Koch, Kösching (DE); Hans-Peter Fleischmann, Stammham (DE); Michael Schöffmann, Lenting (DE)

(73) Assignee: Audi AG, Ingolstadt (DE)

( * ) Notice: Subject to any disclaimer, the term of this patent is extended or adjusted under 35 U.S.C. 154(b) by 127 days.

(21) Appl. No.: 15/129,568

(22) PCT Filed: Feb. 18, 2015

(86) PCT No.: PCT/EP2015/000353

§ 371 (c)(1),
(2) Date: Sep. 27, 2016

(87) PCT Pub. No.: WO2015/144279

PCT Pub. Date: Oct. 1, 2015

(65) Prior Publication Data

US 2017/0174068 A1 Jun. 22, 2017

(30) Foreign Application Priority Data

Mar. 28, 2014 (DE) ........................ 10 2014 004 522

(51) Int. Cl.
*B60K 6/52* (2007.10)
*B60K 6/54* (2007.10)
(Continued)

(52) U.S. Cl.
CPC ................ *B60K 6/52* (2013.01); *B60K 6/485* (2013.01); *B60K 6/54* (2013.01); *B60W 20/20* (2013.01);
(Continued)

(58) Field of Classification Search
CPC ......... B60W 2720/403; B60Y 2300/02; B60Y 2300/182; B60Y 2400/82; Y10S 903/916; Y10S 903/917
See application file for complete search history.

(56) References Cited

U.S. PATENT DOCUMENTS 6,490,511 B1 12/2002 Raftari
6,877,578 B2 * 4/2005 Krzesicki ................ B60K 6/44 180/243

(Continued)

FOREIGN PATENT DOCUMENTS

CN 101239588 A 8/2008
CN 101296832 A 10/2008

(Continued)

OTHER PUBLICATIONS

International Search Report issued by the European Patent Office in International Application PCT/EP2015/000353.

(Continued)

*Primary Examiner* — Anne Marie M Boehler
*Assistant Examiner* — Marlon Alexander Arce
(74) *Attorney, Agent, or Firm* — Henry M Feiereisen, LLC

(57) ABSTRACT

A drive device for a motor vehicle includes a primary powertrain and a secondary powertrain, wherein the primary powertrain includes a combustion engine for generating a total torque; a torque distribution device coupled to the combustion engine and including a first and a second output, wherein the torque distribution device is designed to provide a first partial torque in mechanical form at its first output derived from the total torque, and to provide a second partial torque in electrical form at its second output derived from the total torque; and a transmission which is coupled to the first output of the torque distribution device; wherein the secondary powertrain includes an electric machine which is
(Continued)

coupled to the second output of the torque distribution device; wherein the torque distribution device includes a torque limiting device which is designed to limit the first partial torque to a presettable threshold value.

17 Claims, 1 Drawing Sheet

(51) Int. Cl.
*B60K 6/485* (2007.10)
*B60W 20/20* (2016.01)

(52) U.S. Cl.
CPC ............... *B60W 2710/1022* (2013.01); *B60W 2720/403* (2013.01); *B60Y 2200/92* (2013.01); *B60Y 2300/02* (2013.01); *B60Y 2300/182* (2013.01); *B60Y 2400/82* (2013.01); *Y10S 903/916* (2013.01); *Y10S 903/917* (2013.01)

(56) References Cited

U.S. PATENT DOCUMENTS

| | | | | |
|---|---|---|---|---|
| 7,971,666 | B2 * | 7/2011 | Yamazaki | B60W 20/13 180/65.265 |
| 8,006,790 | B2 * | 8/2011 | Kimura | B60K 6/445 180/65.6 |
| 8,061,464 | B2 * | 11/2011 | Boesch | B60K 6/365 180/197 |
| 8,061,466 | B2 * | 11/2011 | Carlton | E02F 3/6481 172/125 |
| 8,323,144 | B1 * | 12/2012 | Bin | B60K 6/105 180/65.21 |
| 8,556,053 | B2 | 10/2013 | Fleischmann | |
| 8,997,958 | B2 | 4/2015 | Schuller | |
| 9,249,840 | B2 | 2/2016 | Fleischmann | |
| 2001/0003109 | A1 | 6/2001 | Tabata | |
| 2010/0030416 | A1 | 2/2010 | Jinno | |
| 2011/0276207 | A1 | 11/2011 | Falkenstein | |
| 2013/0056323 | A1 | 3/2013 | Fleischmann | |
| 2013/0153356 | A1 | 6/2013 | Fleischmann | |
| 2013/0166127 | A1 * | 6/2013 | Nishinakamura | B60W 10/02 701/22 |
| 2013/0311022 | A1 | 11/2013 | Schmidt | |
| 2014/0195080 | A1 | 7/2014 | Lehmen | |
| 2014/0291101 | A1 | 10/2014 | Schuller | |
| 2014/0345261 | A1 | 11/2014 | Schuller | |
| 2014/0346119 | A1 | 11/2014 | Fleischmann | |
| 2014/0373524 | A1 | 12/2014 | Fleischmann | |

FOREIGN PATENT DOCUMENTS

| | | | |
|---|---|---|---|
| DE | 10059696 | A1 | 6/2001 |
| DE | 10155128 | A1 | 6/2002 |
| DE | 102007022812 | A1 | 11/2008 |
| DE | 112007003264 | T5 | 2/2010 |
| DE | 102008041897 | A1 | 3/2010 |
| DE | 102008042228 | A1 | 4/2010 |
| DE | 102010015423 | A1 | 10/2011 |
| DE | 102010015424 | A1 | 10/2011 |
| DE | 102010023093 | A1 | 12/2011 |
| DE | 102012208462 | A1 | 11/2013 |
| DE | 102014100037 | A1 | 7/2014 |

OTHER PUBLICATIONS

Chinese Search Report dated Feb. 23, 2018 with respect to counterpart Chinese patent application 2015800167426.

Translation of Chinese Search Report dated Feb. 23, 2018 with respect to counterpart Chinese patent application 2015800167426.

* cited by examiner

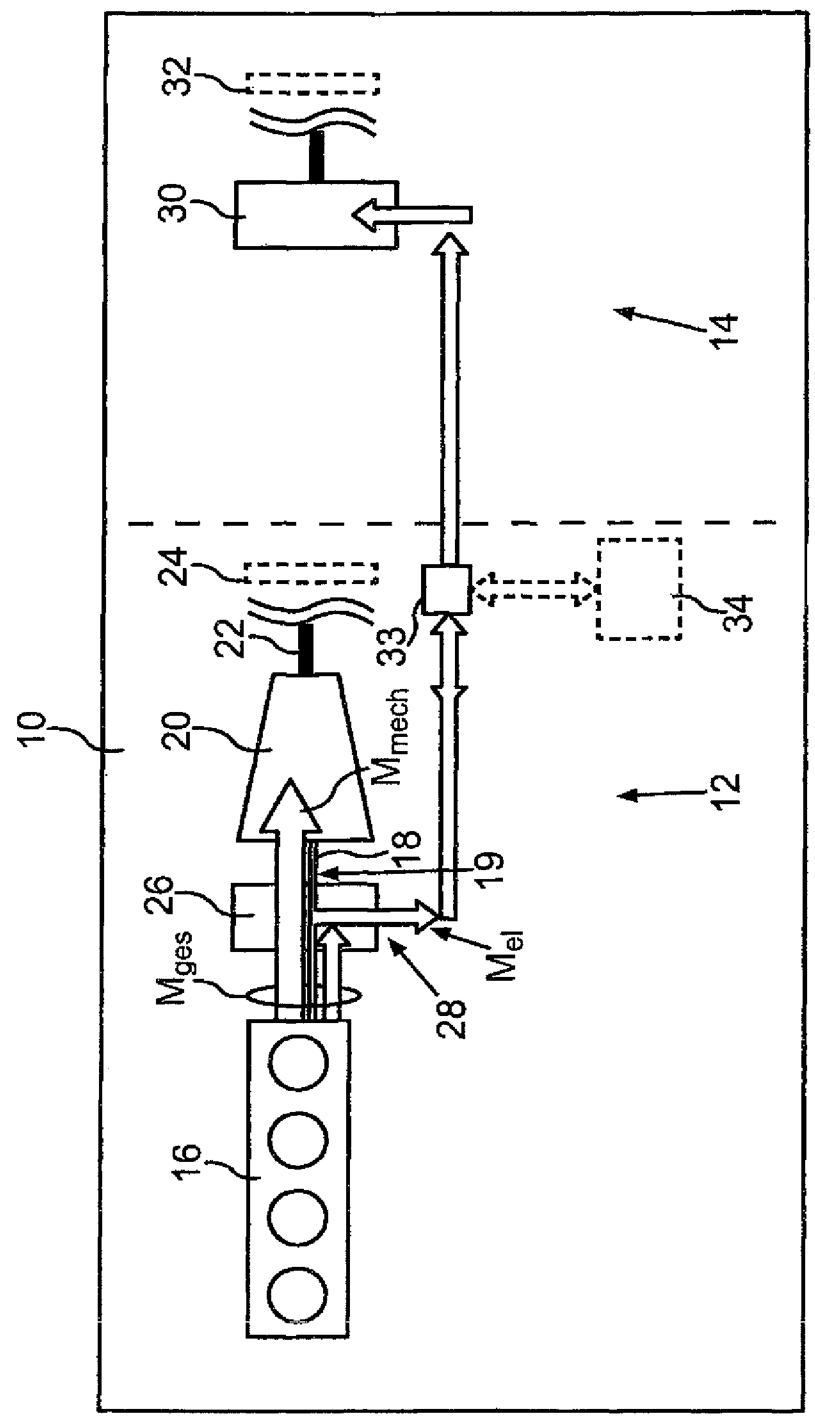
32
30
14
24
22
33
34
10
20
$M_{mech}$
12
18
19
26
$M_{ges}$
$M_{el}$
28
16

DRIVE DEVICE FOR A MOTOR VEHICLE

CROSS-REFERENCES TO RELATED APPLICATIONS

This application is the U.S. National Stage of International Application No. PCT/EP2015/000353, filed Feb. 18, 2015, which designated the United States and has been published as International Publication No. WO2015/144279 and which claims the priority of German Patent Application, Serial No. 10 2014 004 522.6, filed Mar. 28, 2014, pursuant to 35 U.S.C. 119(a)-(d).

BACKGROUND OF THE INVENTION

The present invention relates to a drive device for a motor vehicle with a primary drivetrain and a secondary drivetrain. Hereby the primary drivetrain includes the following: an internal combustion engine for generating a total torque, a torque distribution device coupled with the internal combustion engine and having a first and a second output, wherein the torque distribution device is configured to provide at its first output a first partial torque in mechanical form derived from the total torque, wherein the torque distribution device is configured to provide at its second output a second partial torque in electrical form derived from the total torque, and a transmission which is coupled with the first output of the torque distribution device. The secondary drivetrain includes an electric machine, which is coupled with the second output of the torque distribution device.

A generic drive device is known from the patent document DE 10 2010 015 424 A1. This document discloses a drive device for an all-wheel-drive vehicle with a front axle drive and a rear axle drive, wherein the drive device has a control device, which based on a driver request determines a drive torque for driving the vehicle. The control device is assigned a torque distribution device, which divides the drive torque into an axle wheel torque for the front axle drive and an axle wheel torque for the rear axle drive. With the two axle wheel torques the front axle drive and the rear axle drive can be controlled independent of each other. In an embodiment the motor vehicle has a drive system in which an internal combustion engine and also an electric machine can drive the two front wheels of the vehicle at the vehicle front axle. At the rear axle the rear axle drive can have at least one electric machine, which can drive the two rear wheels of the vehicle. In this way the electric machine assigned to the front axle drive can generate an electric power in an all-wheel-drive mode, which can be provided to the electric machine assigned to the rear axle drive.

With reference to FIG. 1 this document states that the two electric machines are supplied with current from a high-voltage battery. A control device is provided which among other things detects as input parameters an available battery power, the efficiency maps of all drive aggregates and further parameters. Based on these input variables the control device calculates the target torques with which a motor control unit of the internal combustion engine and the power electronics of the electric machines can be controlled. Integrated In the control device are not shown converter components with which the target values are transmitted as motor torques to the drive aggregates.

Regarding further state of the art reference is made to the patent documents DE 10 2010 023 093 A12, DE 11 2007 003 264 T5 and DE 100 59 696 A1.

SUMMARY OF THE INVENTION

The object of the present invention is to further refine a generic drive device to improve the efficiency of the motor vehicle.

This object is solved by a drive device with the features of the independent patent claim.

The present invention is based of the recognition that in the drive device according to the mentioned document DE 10 2010 015 424 A1 conditions are possible in which the entire total torque generated by the internal combustion engine is provided to the transmission, for example to achieve a maximal acceleration, for which in addition the two electric machines of the front and rear axle are supplied with current. A transmission designed for the total torque generated by the internal combustion engine is relatively large and heavy due to the material thickness, bearings and the like that have to be taken into account and therefore adversely affects the efficiency of the motor vehicle.

The present invention therefore takes the approach to limit the partial torque provided to the transmission to a predeterminable threshold value. For this purpose the torque distribution device has a torque-limiting device. In this way the transmission remains compact lightweight and has an optimal efficiency. This also allows a pure front drive, a pure rear drive and a freely distributable all-wheel-drive (0% . . . 100%) without requiring mechanical additions. In this way the transmission can be designed only for the maximal torque that is maximally assigned to the primary axle of the primary drivetrain.

A preferred embodiment is characterized in that the torque distribution device is configured to provide a difference between the total torque and the predeterminable threshold value for the first partial torque as second partial torque. Accordingly the excess torque is conducted past the transmission to the secondary axle of the secondary drivetrain as electrical energy. In this way an all-wheel-drive with a desired partial torque at the primary axle and a desired partial torque at the secondary axle can be realized, i.e., with a desired total drive torque, while at the same time the transmission can be constructed small and lightweight.

The predeterminable threshold value for the first partial torque can be variable. In this way the threshold value can be used for controlling the torque distribution between the primary and the secondary drivetrain. In this context the predeterminable threshold value for the first partial torque can in particular be variable in dependence on at least one of the following controls: control by at least one driving dynamics system, in particular in dependence on a target efficiency, a road friction value, a speed of the moor vehicle, a yaw rate or a transverse dynamics influence on the one hand and also in dependence on a control by the user on the other hand.

Preferably the value range for the predeterminable threshold value, in particular the predeterminable threshold value itself, for the first partial torque is limited to a maximal value, which corresponds to the nominal maximal torque of the transmission. This reliably prevents the risk of destruction of the transmission even when the transmission is small and lightweight, even though the internal combustion engine can be designed for higher total torques.

In this connection the internal combustion engine can be configured to provide a maximal total torque which corresponds to the sum of the maximal value for the first partial torque and the maximal value for the second partial torque, wherein the maximal value for the first partial torque and the maximal value for the second partial torque are different from zero. When the torque generated by the internal combustion engine thus exceeds the torque that is maximally admissible for the transmission the torque distribution device uses the excess torque for generating electrical energy, which is conducted to the electric machine of the secondary axle or to an energy storage.

It is particularly preferred when the electric machine of the secondary drivetrain can be coupled with the second output of the torque distribution device so that the second partial torque can be provided at a supply input of the electric machine in real-time, in particular without intermediate storage in an electrical energy storage. Because each intermediate storage is associated with a reduction of the efficiency this variant allows using the power produced by the internal combustion engine particularly efficiently.

In an advantageous embodiment it is provided that the drive device also has an electrical energy storage, wherein the electrical energy storage can be coupled with the second output of the torque distribution device. In this way the efficiency can be further optimized: when the internal combustion engine is for example operated for the presently requested power in a range with suboptimal efficiency the internal combustion engine can change to an operation with different parameters which ensure a better efficiency of the internal combustion engine. Because this second operating point of course has to provide the requested energy an additional power oftentimes results hereby which is currently not requested. This power can be provided to the electric energy storage where it can then be requested.

The drive device can also include a controllable switch in order to switch between a coupling of the second output of the torque distribution device with the electrical energy storage on one hand and the electric machine of the secondary drivetrain in the other hand. In this context the controllable switch can preferably be configured to switch in dependence on driving situations and/or in response to a control by the user, in particular to couple the second output of the torque distribution device with the electric machine of the secondary drivetrain when the road frictional value and/or the yaw rate and/or the speed of the motor vehicle exceed or fall below predeterminable threshold values and/or to couple the second output of the torque distribution device with the electrical energy storage when a residual range is to be increased purely electrically. The latter can for example occur when due to an input into a navigation system it is clear that the drive leads into an inner city region in the near future. For this purpose the electrical storage is then charged so that the planned route can be completed purely electrically in the inner city region. Of course other strategies are also conceivable. For example the electrical storage can also be charged in order to ensure a maximal thrust at a traffic light. In other cases, i.e., when the electrical residual range is not to be increased, the electrical energy storage is usually kept at a predetermined state of charge.

It is particularly advantageous when the internal combustion engine is coupled with the transmission via an input shaft, wherein the torque distribution device is arranged on this input shaft and is configured as an electric machine. The electric machine is thus connected in driving relationship with the internal combustion engine, the transmission and the electric machine of the secondary axle. The electric machine, which functions as a torque distribution device, thus rotates with the same rotational speed as the input shaft. This system is known under the term “parallel hybrid”. Hereby the mechanical torque passes through to the transmission. When energy for the electric machine is to be diverted or the first partial torque conducted to the transmission is to be limited the electric machine arranged on the input shaft starts to brake and thereby diverts the second partial torque.

The electric machine arranged on the drive shaft is thus assigned to the primary drivetrain, it can be used for an electric drive of the primary axle, for example by retrieving energy from the electric storage. This can occur simultaneous with a drive of the secondary axle by the electric machine arranged on the secondary axle and/or also simultaneous with a drive of the primary axle by the transmission.

In this connection the electric machine assigned to the primary drivetrain can be coupled with a/the electrical energy storage for supply of the electric machine.

Further advantageous embodiments are set forth in the dependent claims.

BRIEF DESCRIPTION OF THE DRAWING

In the following an exemplary embodiment of the present invention is described in more detail with reference to the included drawing in which the sole FIGURE shows a schematic representation of an exemplary embodiment of a drive device according to the invention.

DETAILED DESCRIPTION OF PREFERRED EMBODIMENTS

The FIGURE schematically shows a drive device 10 according to the invention. The drive device includes a primary drivetrain 12 and a secondary drivetrain 14. The primary drivetrain 12 includes an internal combustion engine 16, which is configured to provide the entire torque for the primary drivetrain 12 and the secondary drivetrain 14. The internal combustion engine 16 is coupled with a transmission 20 via an input shaft 18, wherein the output shaft 22 of the transmission, as is known, can be coupled with a primary axle 24, which is not shown for reasons of simplicity.

On the input shaft 18 an electric machine 26 is arranged which is configured as torque distribution device. Via its first output, i.e., the input shaft 18, the torque distribution device provides a first partial torque $M_{mech}$ in mechanical form, which is derived from the total torque $M_{ges}$ generated by the internal combustion engine 16. On the second output 28 the torque distribution device provides a second partial torque $M_{el}$ in electrical form, which is derived from the total torque $M_{ges}$. The transmission 20 is configured for a maximal mechanical torque $M_{mech\text{-}max}$, where $M_{mech\text{-}max}$ is smaller than $M_{ges}$. The electric machine 26 is configured to limit the torque $M_{mech}$ provided by the transmission 20 in any event to the value $M_{mech\text{-}max}$. In the cases in which the actual torque $M_{ges}$ actually provided by the internal combustion engine 16 is greater than $M_{mech\text{-}max}$ the electric machine 26 starts to brake the input shaft 18, generates thereby the electric torque $M_{el}$, which is conducted to an electric machine 30 of the secondary drivetrain 14 in the manner of a cardanic shaft, where it purely electrically drives a secondary axle 32 in a known manner. The electric machine 26 thus realizes a drivetrain generator.

In this way the entire drive device 10 can provide a greater torque $M_{ges}$ provided by the internal combustion engine 16 for the thrust of the motor vehicle wherein the transmission 20 can still be configured small and lightweight.

As a result of the variability of the threshold value for the mechanical partial torque $M_{mech}$ the transmission of a second partial torque $M_{el}$ to the secondary drivetrain 14 can be enabled even when the total torques $M_{ges}$ are smaller than $M_{mech-max}$, for example by corresponding control by at least one driving dynamics system, in particular in dependence on a target efficiency, a road friction value a speed of the motor vehicle, a yaw rate or by control by the user.

While in the approach described above the second partial torque is provided to the electric machine 30 of the secondary drivetrain 14 in real-time, i.e., in particular without intermediate storage in an electrical energy storage, it is also possible to provide this partial torque $M_{el}$ to an electrical energy storage 34. This may be due to the fact that the internal combustion engine 16 operates more efficiently at another operating point than at an operating point at which it generates the exact torque that is currently requested for thrust. Because the operating point can only be changed so that the desired torque is generated the efficiency can only be increased by increasing the total torque $M_{ges}$ generated by the motor 16, so that a momentarily not requested torque is available that can be stored in the electrical storage 34 to be used at a later point in time. For this purpose a controllable switch 33 is provided in order to switch back an forth between a coupling of the second output 28 of the torque distribution device 26 with the electric energy storage 34 and the electric machine 30 of the secondary drivetrain 14.

However, it may also be considered to intentionally select a different operating point of the internal combustion engine 16 in order to increase the energy stored in the electrical energy storage 34, for example when a range that is to be achieved purely eclectically is to be increased. Vice versa it can be provided that for example the second output 28 of the electric machine 26 is coupled with the electric machine 30 when the road friction value and/or the yaw rate exceed or fall below predeterminable threshold values.

The design of the primary axle 24 has to taken into account that the total torque at this axle 24 consisting of a partial torque provided by the internal combustion engine 16 and a partial element optionally provided by the battery 34 must not exceed the mechanical limits at this axle 24.

The drive device 10 according to the present invention enables different drive concepts, which means drive of the primary axle 24 purely mechanically;

drive of the primary axle 24 purely electrically drive of the secondary axle purely electrically;

drive of the primary axle 24 and the secondary axle 32 purely electrically;

drive of the primary axle 24 purely mechanically and drive of the secondary axle 32 purely electrically;

drive of the primary axle 24 mechanically and electrically;

drive of the primary axle 24 mechanically and electrically and the secondary axle 32 purely electrically.

A combination of electrical and mechanical drive of the primary axle 24 is useful in particular in the following cases:

dynamically in order to compensate dead times of the internal combustion engine;

stationary in order to fill torque gaps up to the mechanical limit of the primary axle 24

The corresponding controls can be realized in a motor control unit or a control provided in the electric machine 26.

In summary the internal combustion engine 16 is configured so that it can provide the maximal total torque or the maximal total power for the primary axle 24 and the secondary axle 32, wherein the transmission 20 is designed only for the maximal torque that is to be provided at the primary axle 24 (which is smaller than the maximal total torque of the internal combustion engine 16). However the transmission 20 is protected in the case of outputting the maximal power of the internal combustion engine 16 in that the excess torque is redirected via the electrical cardanic shaft to the electric machine 30 of the secondary drivetrain 14 or the energy storage 34.

What is claimed is:

1. A drive device for a motor vehicle, comprising:

a first drivetrain comprising an internal combustion engine for generating a total torque, a torque distribution device coupled with the internal combustion engine, said torque distribution device having a first output and a second output and being configured to provide at the first output a mechanical first partial torque derived from the total torque, and to provide at the second output an electrical second partial torque derived from the total torque, said torque distribution device comprising a torque limitation device configured to limit the first partial torque to a predeterminable threshold value;

a secondary drivetrain comprising an electric machine which is coupled with the second output of the torque distribution device; and a transmission which is coupled with the first output of the torque distribution device, wherein the torque distribution device is configured to provide a difference between the total torque and the predeterminable threshold value for the first partial torque as second partial torque.

2. The drive device of claim 1, wherein the electric machine of the secondary drivetrain is adapted for coupling with the second output of the torque distribution device so that the second partial torque can be provided in real-time to a supply input of the electric machine.

3. The drive device of claim 2, wherein the second partial torque can be provided to the supply input of the electric machine without an intermediate storage in an electrical energy storage.

4. The drive device of claim 1, further comprising an electrical energy storage, wherein the electrical energy storage is adapted for coupling with the second output of the torque distribution device.

5. The drive device of claim 4, further comprising a controllable switch for switching between a coupling of the second output of the torque distribution device with the electrical energy storage and a coupling of the second output of the torque distribution device with the electric machine of the secondary drivetrain.

6. The drive device of claim 5, wherein the controllable switch is configured to switch in dependence on at least one of a driving situation and a control by the user.

7. The drive device of claim 6, wherein the controllable switch is configured to couple the second output of the torque distribution device with the electric machine of the secondary drivetrain when at least one of a road friction value a yaw rate and a speed of the motor vehicle exceed or fall below predeterminable threshold values.

8. The drive device of claim 6, wherein the controllable switch is configured to couple the second output of the torque distribution device with the electric energy storage when a residual range is to be increased purely electrically.

9. The drive device of claim 1, wherein the internal combustion engine is coupled with the transmission via an input shaft, and wherein the torque distribution device is arranged on the input shaft and is configured as an electric machine.

10. The drive device of claim 9, wherein the electric machine is assigned to the primary drivetrain.

11. The drive device of claim 10, wherein the electric machine is adapted for coupling with an electrical energy storage.

12. A drive device for a motor vehicle, comprising:

a first drivetrain comprising an internal combustion engine for generating a total torque, a torque distribution device coupled with the internal combustion engine, said torque distribution device having a first output and a second output and being configured to provide at the first output a mechanical first partial torque derived from the total torque, and to provide at the second output an electrical second partial torque derived from the total torque, said torque distribution device comprising a torque limitation device configured to limit the first partial torque to a predeterminable threshold value;

a secondary drivetrain comprising an electric machine which is coupled with the second output of the torque distribution device; and a transmission which is coupled with the first output of the torque distribution device, wherein the predeterminable threshold value for the first partial torque is variable.

13. The drive device of claim 12, wherein the predeterminable threshold value for the first partial torque is variable in dependence on at least one of a control by at least one driving dynamics system and a control by a user.

14. The drive device of claim 13, wherein the control by the at least one driving dynamics system is a function of at least one of a target efficiency, a road friction value, a speed of the motor vehicle, a yaw rate, and a transverse dynamic influence.

15. A drive device for a motor vehicle, comprising:

a first drivetrain comprising an internal combustion engine for generating a total torque, a torque distribution device coupled with the internal combustion engine, said torque distribution device having a first output and a second output and being configured to provide at the first output a mechanical first partial torque derived from the total torque, and to provide at the second output an electrical second partial torque derived from the total torque, said torque distribution device comprising a torque limitation device configured to limit the first partial torque to a predeterminable threshold value;

a secondary drivetrain comprising an electric machine which is coupled with the second output of the torque distribution device; and a transmission which is coupled with the first output of the torque distribution device, wherein the torque distribution device is configured to limit a value range for the predeterminable threshold value for the first partial torque to a maximal value, which corresponds to a nominal maximal torque of the transmission.

16. The drive device claim 15, wherein the internal combustion engine is configured to provide a maximal total torque which corresponds to the sum of the maximal value for the first partial torque and the maximal value for the second partial torque (Mel) wherein the maximal value for the first partial torque and the maximal value for the second partial torque are not zero.

17. A drive device for a motor vehicle, comprising:

a first drivetrain comprising an internal combustion engine for generating a total torque, a torque distribution device coupled with the internal combustion engine, said torque distribution device having a first output and a second output and being configured to provide at the first output a mechanical first partial torque derived from the total torque, and to provide at the second output an electrical second partial torque derived from the total torque, said torque distribution device comprising a torque limitation device configured to limit the first partial torque to a predeterminable threshold value;

a secondary drivetrain comprising an electric machine which is coupled with the second output of the torque distribution device; and a transmission which is coupled with the first output of the torque distribution device, wherein the torque distribution device is configured to limit the predeterminable threshold value to a maximal value which corresponds to a nominal maximal torque of the transmission.

* * * * *